United States Patent
Zenner et al.

(10) Patent No.: US 6,832,212 B1
(45) Date of Patent: *Dec. 14, 2004

(54) METHOD AND APPARATUS FOR MANIPULATING BILLING AND PAYMENT INFORMATION WITHIN A BROWSER INTERFACE SYSTEM

(75) Inventors: Hal B. Zenner, Fair Haven, NJ (US); Thomas M. Rowland, Fair Haven, NJ (US)

(73) Assignee: NCR Corporation, Dayton, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 742 days.

(21) Appl. No.: 08/940,702

(22) Filed: Sep. 30, 1997

(51) Int. Cl.[7] ............................................. G06F 17/00
(52) U.S. Cl. ...................................................... 705/40
(58) Field of Search ............................... 705/34, 26, 42, 705/40, 7, 39, 30, 35; 709/219; 379/115; 713/200; 345/344; 717/11

(56) References Cited

U.S. PATENT DOCUMENTS

| | | | | |
|---|---|---|---|---|
| 5,608,874 A | * | 3/1997 | Ogawa et al. | 395/200.76 |
| 5,699,528 A | * | 12/1997 | Hogan | 705/40 |
| 5,740,549 A | * | 4/1998 | Reilly et al. | 705/14 |
| 5,761,650 A | * | 6/1998 | Munsil et al. | 705/34 |

FOREIGN PATENT DOCUMENTS

EP 0 745 947 A2 * 12/1996

OTHER PUBLICATIONS

Publication on ZD Internet Magazine, "Online Payments Gain Appeal", Oct. 1997.
Web Site Publication, entitled *Internet Banking*.
Protocol document, entitled "Hypertext Transfer Protocol—http/1.1" by R. Fielding, UC Irvine; H. Frystyk, MIT/LCS; T. Berners–Lee, MIT/LCS, Nov. 22, 1995.
Protocol Document, entitled "Simple Mail Transfer Protocol," by Jonathan B. Postel, Information Sciences Institute, University of Southern California, Aug. 1982.
Protocol Document, entitled "Standard for the Format of ARPA Internet Text Messages", revised by David H. Crocker, Dept. of Electrical Engineering, University.

\* cited by examiner

*Primary Examiner*—Thomas A. Dixon
(74) *Attorney, Agent, or Firm*—Crummy, Del Deo, Dolan, Griffinger & Vecchione; Charlene Stukenborg; James M. Stover

(57) ABSTRACT

A method for manipulating billing and payment information comprising the steps of: loading billing information stored at a local location; accessing retained criteria; formatting field information within a data record automatically; acting on the retained criteria; displaying the formatted field information; and operating on the formatted field information.

15 Claims, 5 Drawing Sheets

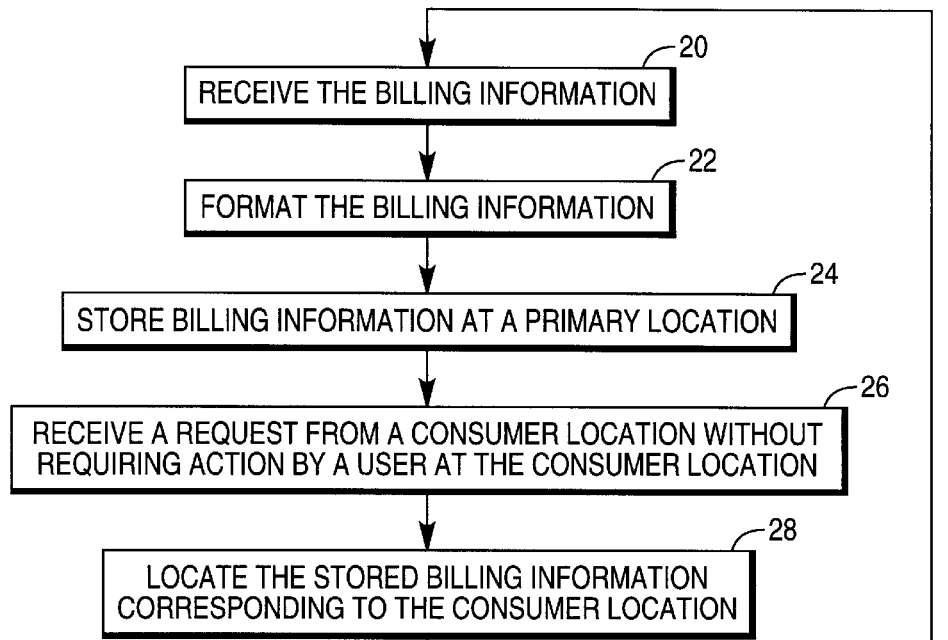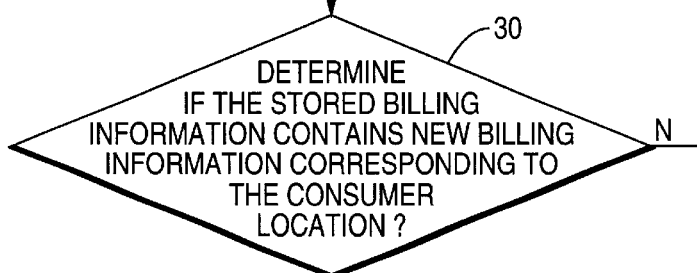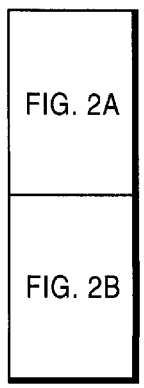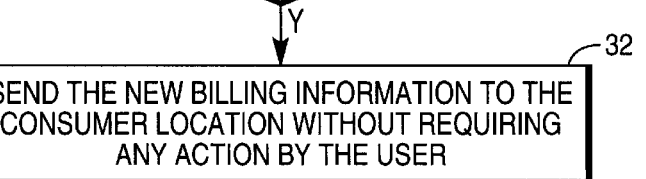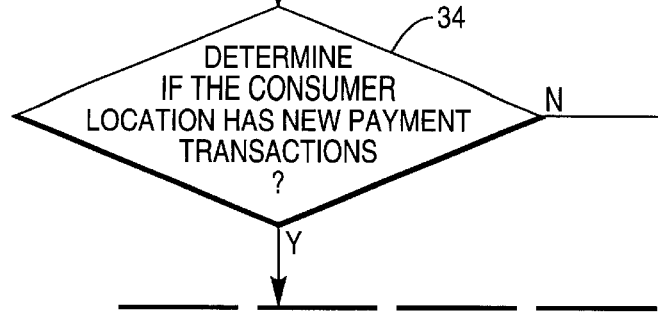

METHOD AND APPARATUS FOR MANIPULATING BILLING AND PAYMENT INFORMATION WITHIN A BROWSER INTERFACE SYSTEM

RELATED APPLICATION

This application is related to copending U.S. patent application Ser. No. 08/940,387, filed on Sep. 30, 1997, entitled "INTERNET CONSUMER BILLING NOTIFICATION SERVICE" having common inventors and a common assignee.

FIELD OF THE INVENTION

This invention relates to an interface mechanism for manipulating financial information, and more particularly to manipulating detailed billing information.

BACKGROUND OF THE INVENTION

Banks have historically played an important part in the payment of consumer bills. For instance, banks have provided checking accounts and direct transactions which enable consumers to pay their bills. Billing has typically been from an individual vendor to the consumer. Consolidation has occurred with the introduction and use of bank credit cards. Still, the consumer billing system typically involves a vendor sending out a bill to a consumer typically through the postal service. The consumer is required to receive the billing correspondence, open the document and locate the bill within the promotional material. It will be noted that bill may be reviewed and mentally scheduled for payment while being physically kept in a box, drawer, etc. When the bill is paid, the consumer writes a check, and returns a part of the bill to the vendor for processing typically by a lock box service.

Computerized banking has been offered for a number of years by many financial institutions. However, this service typically has concerned checking and manipulating balances between a consumer's account. Some banks offer computerized bill payment, however, unless the payee has an account at the same institution as the payer, an actual paper check is typically printed by the bank and mailed. Thus, the consumer does not have their bills presented to this system, only the ability to pay the bills they have scheduled or entered into the system.

Because the Internet evolved from the ARPAnet, a research experiment that supported the exchange of data between government contractors and (often academic) researchers, an on-line culture developed that is alien to the corporate business world. Although the Internet was not designed to make commercialization easy, Internet banking is rapidly evolving to provide an enhancement to computerized bill payment, permitting businesses, other organizations and individuals to communicate throughout the world. The growth and popularity of the Internet is providing new opportunities for electronic commerce, including new methods of merchandising and payment. Payment systems are evolving to better serve the new forms of commerce. Presently most Internet payments are made with credit card transactions. However, in order for the Internet to develop as a significant commercial marketplace, other payment alternatives which are acceptable to the business and consumer must be available.

While the demand for conducting business over the Internet continues to increase, individuals and businesses desiring to effect payments on the Internet face many barriers. Internet users operate on a wide variety of hardware and software platforms. Businesses, who need to reach a maximum number of consumers, may be unwilling to be constrained by Internet payment systems that fail to operate across major hardware and software platforms. Consumers cannot conduct business with merchants whose systems do not readily interface with their system. In addition, banks and other financial institutions currently process transactions under a wide variety of networks and protocols that are well-established and extremely difficult and expensive to change.

The incompatibility of the various billing and transaction activities in addition to the dilemma of vendors who sell products through traditional channels but would like to offer billing and payment over the Internet presents serious limitations to true Internet banking. Typically consumers must manually check their bills and then enter them into an Internet bank system for payment. Even where the vendor's system is fully compatible with the payer's Internet bank system, the payer must manually check their accounts for bills in order to know that they have a bill for payment.

Numerous money management software programs in addition to spreadsheet programs exists to assist a consumer in tracking their bills and payments. However, they require that the consumer must enter the billing and payment information. To track individual entries to a particular account or cost center requires further detail entry or posting to a general ledger type system.

Moreover, utilization of the above-mentioned Internet banking systems requires that when a consumer has a question about a transaction or item on a bill they must typically call in their query to a customer service representative.

Accordingly, there is a need for providing a network billing and payment system providing automatic access to detailed transactions which permit the aliasing of entries and provides automatic consumer query capabilities.

SUMMARY OF THE INVENTION

The present invention is a method for manipulating billing and payment information. The method comprises the steps of: loading billing information stored at a local location; accessing retained criteria; formatting field information within a data record automatically; acting on the retained criteria; displaying the formatted field information; and operating on the formatted field information.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use in connecting Internet users and shall be so described, the present invention is equally well suited for use in other network communication systems. Although the present invention is particularly well suited for use in handling telecommunication billing and the associated detailed billing information and shall be so described, the present invention is equally well suited for use with many other billing types including but not limited to credit card statements, parcel shipment, supplies, equipment leasing, equipment maintenance and travel expenses.

Transaction Control Protocol/Internet Protocol (TCP/IP) is the communications standard between hosts on the Internet. TCP/IP defines the basic format of the digital data packets on the Internet allowing programs to exchange information with other hosts on the Internet.

Domain names direct where e-mail is sent, files are found, and computer resources are located. They are used when accessing information on the World Wide Web (WWW) or connecting to other computers through Telenet. Internet users enter the domain name, which is automatically converted to the Internet Protocol address by the Domain Name System (DNS). The DNS is a service provided by TCP/IP that translates the symbolic name into an IP address by looking up the domain name in a database.

E-mail was one of the first services developed on the Internet. Today, e-mail is an important service on any computer network, not just the Internet. E-mail involves sending a message from one computer account to another computer account. E-mail is used to send textual information as well as files, including graphic files, executable files word processing and other files. E-mail is becoming a popular way to conduct business over long distances. Using e-mail to contact a business associate can be faster than using a voice telephone, because the recipient can read it at a convenient time, and the sender can include as much information as needed to explain the situation.

Figure 1:
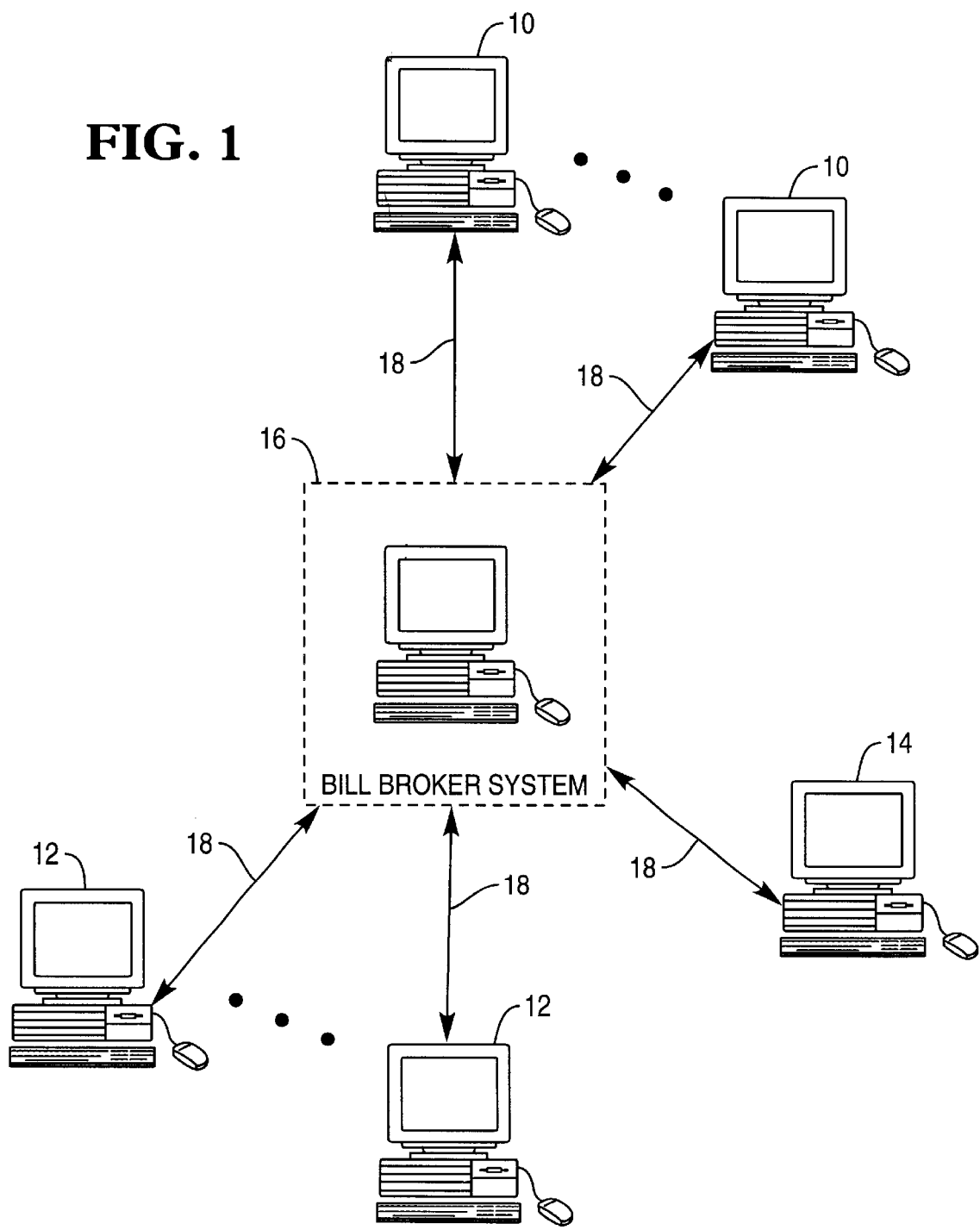
FIG. 1 is an overview of the Internet consumer billing notification service and the Internet consumer billing interface.

Referring to FIG. 1 there is shown an overview of the present invention Internet consumer billing interface and the related Internet consumer billing notification service. Referred to herein, respectively, as the "Bill Source" application program and the "BillBroker" service. At least one consumer system 10 has a BillBrowser program installed and running. The consumer system 10 is connected through the Internet 18 to a BillBroker system 16. The BillBroker system 16 is connected to at least one Biller system 12 through the Internet 18 or other communication link. At least one financial institution system 14 is connected to the BillBroker system 16 through the Internet 18 or other communication link such as a proprietary secured link.

A consumer signs up or registers for a BillBroker service which is provided by the BillBroker system 16. This can be done over the Internet 18 through a World Wide Web (WWW) interface, e-mail interface with attachments, or through the physical receipt of manual documents.

The consumer system 10 after registration receives a BillBrowser application program from the BillBroker system 16. The BillBrowser application, as would be understood by a person skilled in the art, runs on the consumer system 10 as a stand-alone application, an Internet application plug-in, a Java applet or other suitable user agent program. The distribution of the BillBrowser application program can be done over the Internet 18 or through the mailing of a disk or CD-ROM.

The BillBrowser application is a specialized Internet browser interface between the consumer and the BillBroker service. The BillBrowser application on the consumer system 10 communicates through the Hypertext Transport Protocol (HTTP) over the Internet 18 to the BillBroker service on the BillBroker system 16.

HTTP is an application-level protocol for distributed, collaborative, hypermedia information systems. It is a generic, stateless, object-oriented protocol which can be used for many tasks, such as name servers and distributed object management systems, through extension of its request methods (commands). A feature of HTTP is the typing and negotiation of data representation, allowing systems to be built independently of the data being transferred. HTTP is described in a working document of the Internet Engineering Task Force (IETF), entitled "Hypertext Transfer Protocol—HTTP/1.1" dated Nov. 22, 1995, which is incorporated herein by reference.

The BillBrowser application is constructed using standard Internet based tools such as Hypertext Markup Language (HTML) and Java. The BillBrowser application can use the Simple Mail Transfer Protocol (SMTP) to perform some of its functions.

SMTP was developed to provide for reliable and efficient transfer of e-mail between different communication environments. SMTP is independent of a particular transmission subsystem and requires only a reliable data stream channel. The ability to relay e-mail between different communication environments is an important feature. SMTP is described in Internic RFC #821, entitled "Simple Mail Transfer Protocol" dated August 1982, which is incorporated herein by reference.

A transport service provides an interprocess communication environment (ICPE). An ICPE may cover one network, span several networks, or a subset of a network. IPCEs are not one-to-one connections, but may communicate through another process, such as a mutually known IPCE. E-mail is a use of interprocess communications. E-mail can be communicated between processes in different IPCEs by relaying them through a process connecting two or more IPCEs. Therefore e-mail can be relayed between hosts on different transport systems by a host on both transport systems.

The interconnection between different systems requires a standard for the format of e-mail messages. One such standard is described in Internic RFC #822, entitled "Standard For The Format Of ARPA Internet Text Messages" dated Aug. 13, 1982, which is incorporated herein by reference.

After installing the BillBrowser application on the consumer system 10, the consumer enters user specific information such as name, telephone number and preferred payment information (e.g. credit card, EFT, etc.). The consumer selects from a list of Billers (vendors), which bills are to be received by the BillBroker service from the Billers systems 12. The BillBrowser application on the consumer system 10 obtains the list of Billers by querying the BillBroker service on the BillBroker system 16 over the Internet 18. Alternatively, the BillBrowser application can indicate to the BillBroker service to send all bills that are available.

The BillBrowser application runs in the background on the consumer system 10. Periodically, the BillBrowser application "wakes up" and contacts the BillBroker service. Accordingly, the consumer's system 10 is preferably "Internet-ready", having the BillBrowser application installed, turned on (or periodically turned on) and having the ability to access a communications line for connection to the Internet 18 at predetermined intervals. When connected, the BillBrowser application establishes a secure Internet connection, such as through the HTTPS protocol, to the BillBroker service. This may require automatically dialing the consumers Internet Service Provider (ISP) or Internet service, logging on to the ISP, then issuing the BillBrowser Internet address. The BillBrowser application transmits a query that identifies and authenticates the consumer to the BillBroker service, and checks whether there is any new information such as new billing statements from Billers, billing details or records, special messages from Billers, etc. to be accessed. The BillBrowser application can be configured to do the query in the middle of the night to minimize inconvenience to the consumer and enable the downloading of extensive and graphically rich information. The BillBrowser application can access the BillBroker service on demand in addition to the scheduled time. The BillBrowser application can utilize existing client ISP and TCP/IP dialing software to access the BillBroker application. All of the transactions between the BillBroker service and BillBrowser application are secure and private.

If there are new bills or other information present at the BillBroker system 16 from the Biller's system 12, the BillBrowser program automatically downloads this information to the consumer's system 10, then notifies the consumer through a configurable on-screen message and audible alert if desired.

A consumer can use the BillBroker service to question a line item on a bill by flagging the line item and entering an appropriate comment which is then routed to the appropriate Biller system 12 as an inquiry for review. This inquiry would be transmitted from the BillBrowser application to the BillBroker service during the next access cycle. The consumer system 10 receives the current period detail billing by default, but can request earlier periods. This permits the viewing and manipulation of any available period as well as the comparison of two arbitrary periods. A preferred bill payment method is established during registration which can be used to pay the bills that are presented to the consumer. The consumer (user) flags a particular bill for payment and indicates if it is to be paid in full, part, or excess. This information is transferred from the BillBrowser application to the BillBroker service during the next access cycle. The BillBroker service mediates payments for all financial transactions between the consumer system 10, the Biller system 12 and Financial Institutions 14.

The BillBroker service has three primary functions: billing store and forward service; intermediary payment broker; and intermediary consumer service broker. The billing store and forward service accepts billing data from Billers systems 12, stores this information in a database at the BillBroker system 16, and then forwards the information to the corresponding registered consumer system 10 having the BillBrowser application installed. The billing data may be presented electronically in a format defined by the BillBroker service, in a format that requires conversion, or entered manually and posted to the BillBroker system 16. The intermediary payment broker recognizes the payment requests made by the consumer (user) through the BillBrowser application and arbitrates the transactions between the appropriate financial institution 14 and the Billers systems 12 (vendors). The intermediary consumer service broker confirms the delivery of bills to the consumer system 10 with the Biller system 12 and can forward any billing query requests.

Figure 2B:
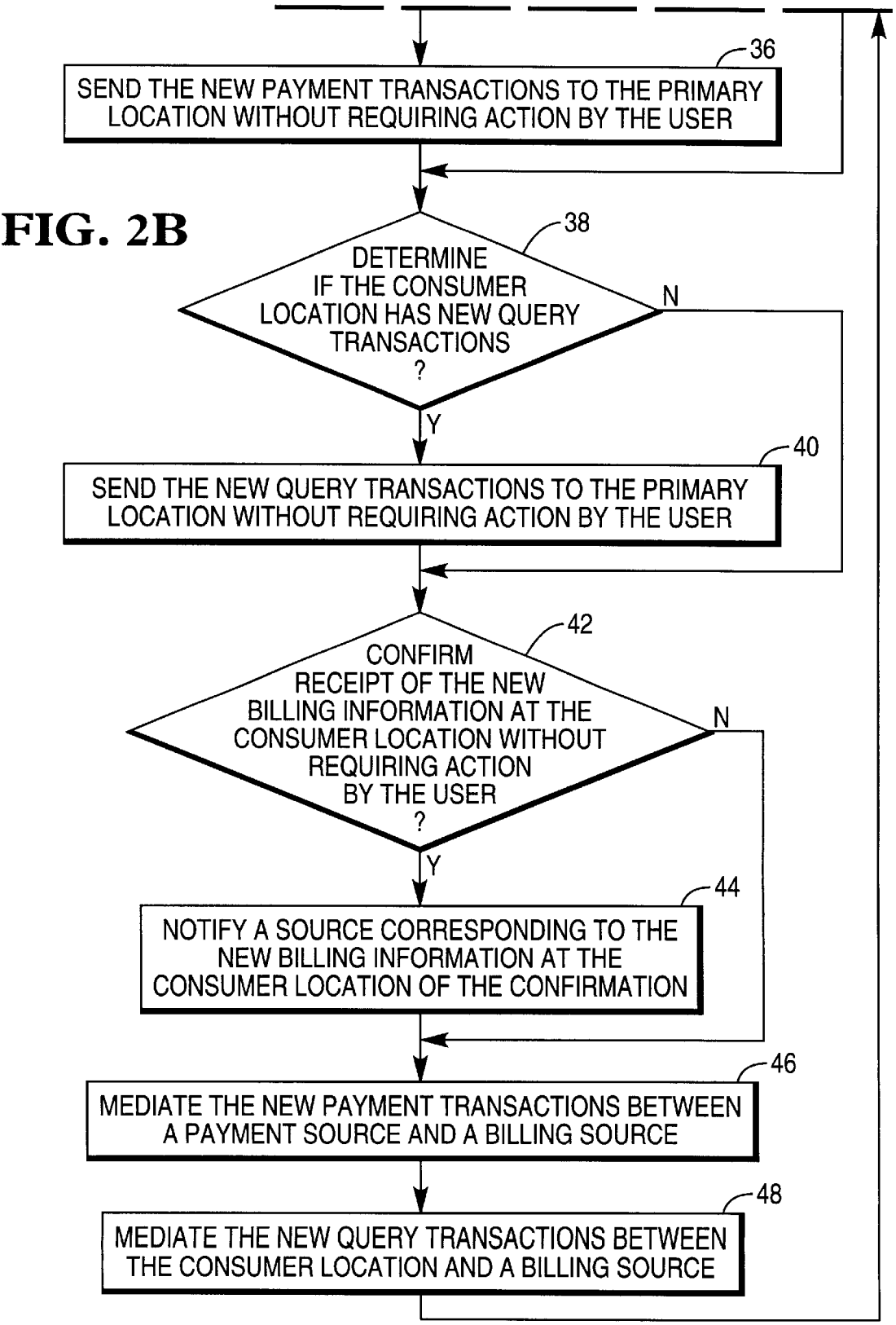
FIG. 2 is a high level flow chart of the Internet consumer billing notification service.

Referring to FIG. 2 there is shown a high level flow chart of the Internet consumer billing notification service. In step 20 the BillBroker service receives the billing information from the Biller system 12. Next in step 22 the billing information is formatted before being stored at a primary location in step 24. In step 26 the BillBroker service receives a request from a consumer location without requiring action by a user at the consumer location. Next in step 28 the BillBroker service locates the stored billing information corresponding to the consumer location and in step 30 determines if the stored billing information contains new billing information corresponding to the consumer location. If there is new billing information, then in step 32 the BillBroker service sends the new billing information to the consumer location without requiring any action by the user. In step 34, it is determined if the consumer location has any new payment transactions which are then sent to the primary location which is the BillBroker service in step 36 without requiring action by the user. Additionally, the step of notifying the user of successful mediation of the new payment transactions between the payment source and the billing source can follow. In step 38, it is determined if the consumer location has new query transactions which are sent in step 40 to the BillBroker service without requiring action by the user. Further, the step of providing the user with a response to the new query transaction can follow as appropriate. In step 42 receipt of the new billing information at the consumer location is confirmed without requiring action by the user which would then be used in step 44 to cause notification to a source corresponding to the new billing information at the consumer location of the confirmation. Additionally in step 46 the BillBroker service mediates the new payment transactions between a payment source and a billing source and in step 48 mediates the new query transactions between the consumer location and a billing source.

In summary, the BillBroker service performs a number of functional responsibilities including: consumer and Biller registration; storage of individual consumer information; consumer authentication and secure transactions; BillBrowser application distribution; formatting, packaging and transmitting of billing summary and detail information to the consumer; transmission of optional marketing information and other information from the Biller to the consumer; storage of historical billing information; tracking and analysis for the Biller of activity and transactions; mediation of payments, billing queries, and broker activities between the consumer, and financial institutions and the Biller. The BillBroker service provides a passive, electronic notification process wherein the consumer does not have to actively log on or actively interrogate a non-local source or service to determine if they have any new bills or a reply to a query. The information is loaded seamlessly and transparently into their local system.

Figure 3:
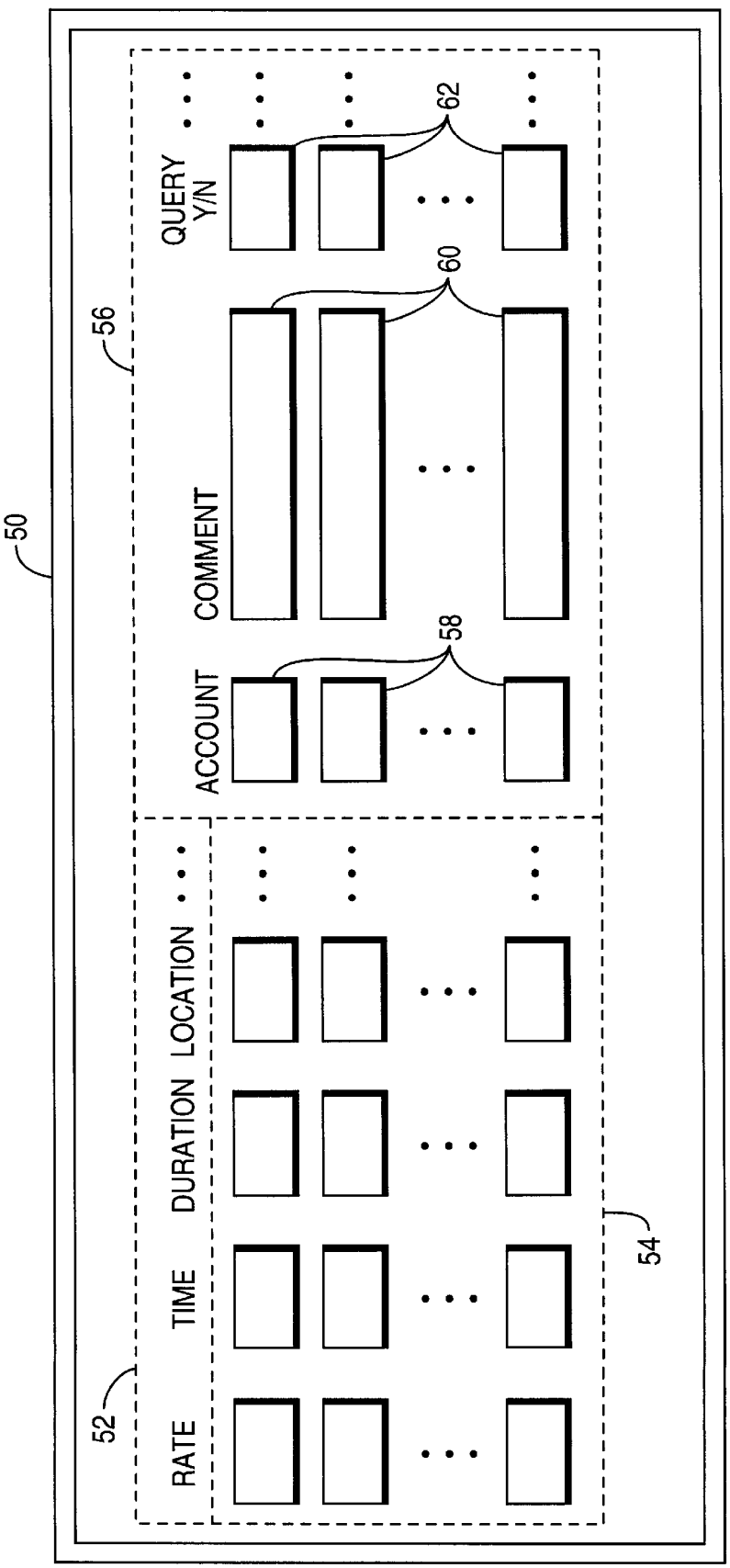
FIG. 3 is an exemplary display screen of the BillBrowser application.

A consumer can utilize the BillBrowser application to view and manipulate the billing detail information which has been automatically downloaded. The BillBrowser application dynamically configures the display for a particular billing detail type. Referring to FIG. 3 there is shown an exemplary display screen of the BillBrowser application for a telephone bill. A computer display 50 for the consumer system 10 shows billing field descriptions 52 and billing field information 54. This information is dynamically configured including the field descriptions, field sizes, data types and editing, number of fields and other relevant information based upon information supplied by the BillBroker service to the BillBrowser application. Additionally, the consumer system 10 contains annotated and aliasing information 56 which includes an aliasing field such as a billing account field 58, a comment field 60, a query flag 62 as well as additional flexible fields. The billing account field 58 can be used to assign a general ledger number or a simple English reference such as dining, Mr. Jones, Big Business Inc., etc. The billing account field 58 may be linked optionally to existing money management software. Furthermore, the billing account field 58 can be used for aliasing or tagging, wherein the information persists and is saved such that future billing details having detailed matching records can be assigned the same default information. This information would be transferred from the BillBrowser application to the BillBroker service during the next scheduled query of the BillBroker service. The comment field 60 allows for labeling detailed notes or questions relating to the item. The query flag 62 provides an indication for the BillBrowser application that the detailed record is to be sent to the Biller system 12 by the BillBroker system 16 for review and response.

The consumer can manipulate the detailed billing records by utilizing various BillBrowser application operations on the downloaded data, permitting annotation (such as is shown and described above with respect to the aliasing information 56), sorting, filtering, highlighting, saving and printing of the information. As the detailed billing records are stored locally, access and manipulation is rapid. Filtering can include selecting all detailed records having a value above a threshold (such as a call over a predetermined length of time or dollar amount), selecting all detailed records of a selected type or range of types (such as all calls to a particular telephone number, all calls that are to other area codes, all 900 and 700 calls, calls made during a selected time period, etc.). While this example is shown for telephone billing, it is only illustrative and is equally well suited to other billing information such as credit card statements, shipping, etc.

Figure 4:
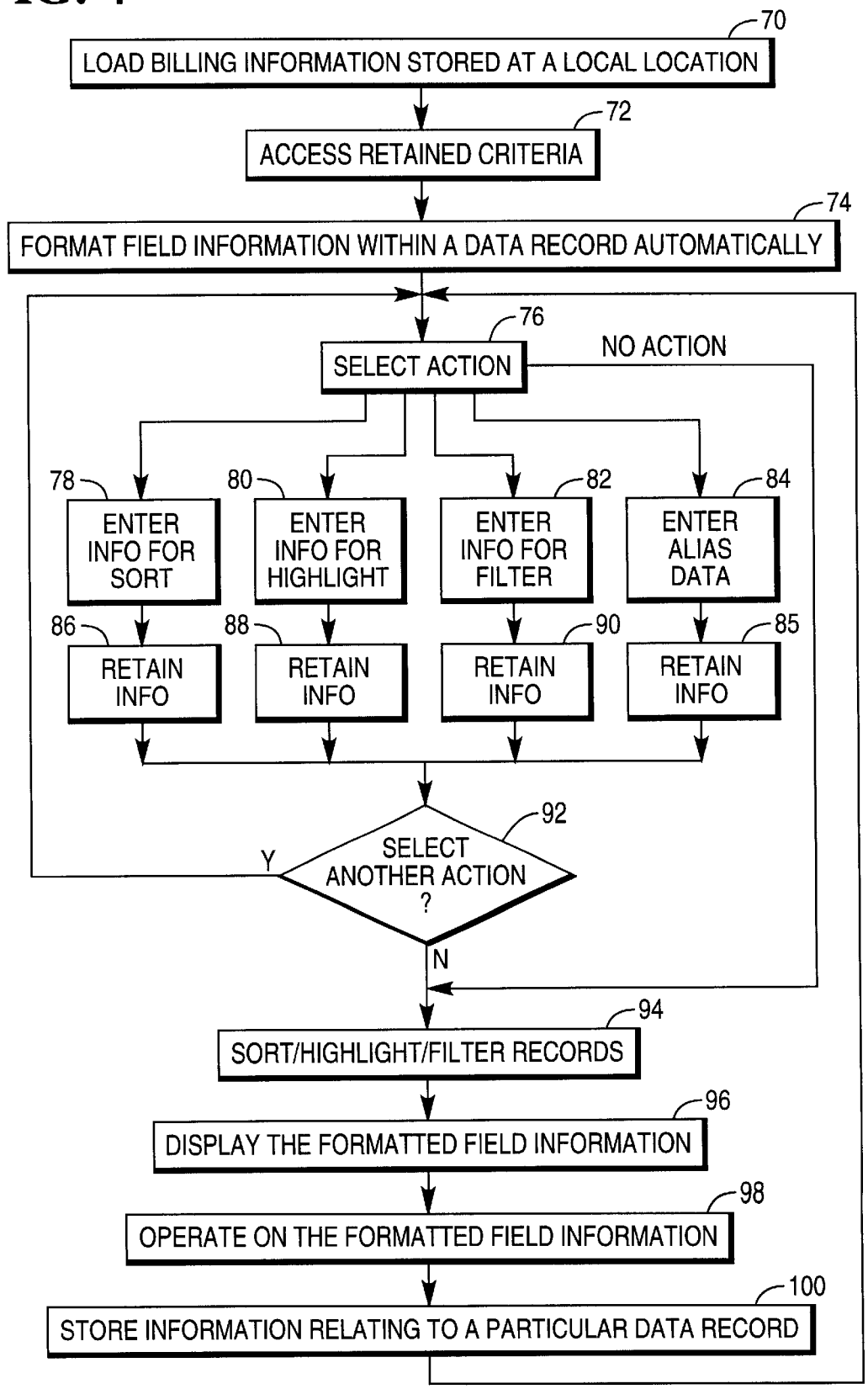
FIG. 4 is a high level flow chart of the BillBrowser application.

Referring to FIG. 4 there is shown a high level flow chart of the Bill Browser application. In step 70 the stored billing information is loaded at a local location. Retained criteria is accessed in step 72. The criteria may be retained locally and applied to new data records locally or may be uploaded to the Bill Broker service and associated with the corresponding new data records before downloading. In step 74 the field information within a data record is formatted and configured automatically, including the field descriptions, field sizes, data types and editing, number of fields and other relevant information. An action is selected in step 76. Sorting criteria is entered in step 78 if selected. Highlighting criteria (such as 900 calls, etc.) is entered in step 80 if selected. Filtering criteria is entered in step 82 if selected. Aliasing data is entered in step 84. When no new criteria is to be entered, the retained criteria that was accessed in step 72 or entered through the prior action selection in step 76 can be used directly in step 94. In steps 85, 86, 88 and 90 the corresponding criteria/data that was entered is retained for use with similar billing information. Optionally the user can be queried to determine if this information is to replace earlier information. At this point in step 92 the procedure can loop back to step 76 for the selection of an additional action or to change (override) the last action. The data records in step 94 are sorted, highlighted and filtered in response to the previously retained criteria or the entered criteria. Next, the formatted field information and data is displayed in step 96. Operations occur on the formatted field information in step 98 such as annotated information, which is shown and described above with respect to the aliasing information 56, relating to a particular data record. Information relating to a particular data record is stored at the local location in step 100. Bill payment and query information can be entered and processed in a similar manner as the annotated information.

Numerous modifications and alternative embodiments of the invention will be apparent to those skilled in the art in view of the foregoing description. This includes but is not limited to extracting and formatting data records to interface to an existing spreadsheet, database, or financial application. The data record configuration can be used to generate configurations for an existing report writer application. Also, this type of interface can be used to display the billing data and retained criteria in other formats, such as bar graphs, pie charts, and at different levels of granularity (ex. summarizations and sub-totals). Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. In a browser interface system, a method for manipulating billing and payment information comprising the steps of:

downloading billing information to a local location, wherein said billing information is obtained using a specialized application program which communicates over the internet to a billing service and wherein said billing information indicates at least one bill which a biller requires payment on, said at least one bill comprising a plurality of detailed billing records;

accessing retained criteria entered by a user, wherein said retained criteria includes at least one of sorting, highlighting, filtering and aliasing criteria for personalizing the display of the detailed billing records contained within said at least one bill;

formatting the display of field information within said detailed billing records automatically;

acting upon said retained criteria;

displaying said detailed billing records and said formatted field information in accordance with the acted upon retained criteria using the specialized application without invoking a separate application program; and operating on said formatted field information.

2. The method as recited in claim 1 wherein the step of acting on said retained criteria further comprises the step of filtering data records in response to a preselected filtering criteria.

3. The method as recited in claim 2 wherein said preselected filtering criteria persists with similar billing information.

4. The method as recited in claim 1 wherein the step of acting on said retained criteria further comprises the step of sorting data records in response to a preselected sorting criteria.

5. The method as recited in claim 4 wherein said preselected sorting criteria persists with similar billing information.

6. The method as recited in claim 1 wherein the step of acting on said retained criteria further comprises the step of highlighting data records in response to a preselected highlighting criteria.

7. The method as recited in claim 6 wherein said preselected highlighting criteria persists with similar billing information.

8. The method as recited in claim 1 further comprising the step of storing information relating to a particular data record.

9. The method as recited in claim 8 wherein said information relating to said particular data record comprises aliasing information.

10. The method as recited in claim 9 wherein said aliasing information persists with similar billing information.

11. The method as recited in claim 8 wherein said information relating to said particular data record comprises payment transaction information.

12. The method as recited in claim 8 wherein said information relating to said particular data record comprises query information.

13. The method for manipulating billing and payment information in accordance with claim 1, further comprising the steps of:

provide at least one additional field associated with each one of said plurality of detailed billing records, said at least one additional field including at least one of an aliasing field, a comment field, or a query flag, said at least one additional field allowing for the entry of annotation and aliasing information by said user; and displaying said detailed billing records, said formatted field information and said at least one additional field in accordance with the acted upon retained criteria using the specialized application without invoking a separate application program.

14. An internet browser interface for manipulating consumer billing and payment information comprising:

means for downloading billing information to a local location, wherein said billing information is obtained using a specialized application program which communicates over the internet to a billing service and wherein said billing information indicates at least one bill which a biller requires payment on, said at least one bill comprising a plurality of detailed billing records;

means for accessing retained criteria entered by a user, wherein said retained criteria includes at least one of sorting, highlighting, filtering and aliasing criteria for personalizing the display of the detailed billing records contained within said at least one bill;

means for formatting the display of field information within said detailed billing records automatically;

means for acting upon said retained criteria;

means for displaying said detailed billing records and said formatted field information in accordance with the acted upon retained criteria using the specialized application without invoking a separate application program; and means for operating on said formatted field information.

15. The internet browser interface for manipulating consumer billing and payment information in accordance with claim 14, further comprising:

means for providing at least one additional field associated with each one of said plurality of detailed billing records, said at least one additional field including at least one of an aliasing field, a comment field, or a query flag, said at least one additional field allowing for the entry of annotation and aliasing information by said user; and means for displaying said detailed billing records, said formatted field information and said at least one additional field in accordance with the acted upon retained criteria using the specialized application without invoking a separate application program.

* * * * *